(12) United States Patent
Kerins et al.

(10) Patent No.: US 6,258,427 B1
(45) Date of Patent: Jul. 10, 2001

(54) FLUSHABLE DOUBLE-SIDED RELEASE LINER

(75) Inventors: John E. Kerins, Neenah; Nathan A. Genke, Menasha, both of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/474,273

(22) Filed: Dec. 29, 1999

(51) Int. Cl.⁷ .................................................. B32B 9/04

(52) U.S. Cl. ..................... 428/41.8; 428/40.1; 428/195; 428/335; 428/352; 604/358

(58) Field of Search .................................. 428/40.1, 40.8, 428/195, 335, 352; 604/358

(56) References Cited

U.S. PATENT DOCUMENTS 5,981,012 * 11/1999 Pomplun et al. ................... 428/40.1
5,985,396 * 11/1999 Kerins et al. ....................... 428/41.8

* cited by examiner

*Primary Examiner*—Cathy Lam
(74) *Attorney, Agent, or Firm*—Kilpatrick Stockton LLP

(57) ABSTRACT

The present invention is directed to a flushable double-sided release liner. The flushable double-sided release liner is formed by applying a release coating onto both surfaces of a water-sensitive film. The flushable double-sided release liner maintains its integrity and strength when in use, but disperses when placed in contact with water, such as in a conventional sink or toilet. Moreover, the present invention is directed to water-dispersible products, including flushable products, which contain the flushable double-sided release liners.

28 Claims, No Drawings

FLUSHABLE DOUBLE-SIDED RELEASE LINER

FIELD OF THE INVENTION

The present invention is directed to a flushable double-sided release liner. The flushable double-sided release liner is a three-layer laminate of a water-sensitive film sandwiched between two layers of a release coating. The double-sided flushable release liner is formed by applying a release coating onto both surfaces of a water-sensitive film. The flushable double-sided release liner maintains its structural integrity and strength when in use, but disperses when placed in contact with water, such as in a conventional sink or toilet. Moreover, the present invention is directed to products, including flushable and non-flushable products, which contain the flushable release liner.

BACKGROUND OF THE INVENTION

Disposable products have revolutionized modern lifestyle and are of great convenience to society. Such products generally are relatively inexpensive, sanitary and quick and easy to use. Disposal of such products, however, is a concern as landfills close and incineration contributes to urban smog and pollution. Consequently, there is an urgent need for disposable products that can be disposed of without dumping or incineration. An ideal disposal alternative would be the use of municipal sewage treatment plants and private residential septic systems. Products suited for disposal in sewage systems that can be flushed down a conventional toilet are termed "flushable." An essential feature of flushable products is that they must have sufficient strength for their intended use, yet lose structural integrity upon contact with water.

Numerous consumer products, which were formerly unable to be disposed of in a conventional toilet, are made flushable today. Such products include water-soluble films, wipes, tampon applicators, etc. However, many consumer products have remained unflushable.

One such product that has remained unflushable to date is release liners. Release liners are used to temporarily cover an adhesive layer before use in many personal care products. The release liner provides protection for the adhesive layer against exposure to materials, which might negatively affect the ability of the adhesive strip to adhere to a desired substrate, and provides protection against undesired, premature adhesion to a substrate. Conventional release liners comprise a paper substrate coated with a release coating. The release coating is formulated to provide very little adhesion of the coated paper to any other substrate, particularly pressure-sensitive, hot-melt adhesives, so the release liner may be easily removed from the adhesive strip without disturbing the adhesive strip. Typically, release coatings comprise a silicone-containing polymeric material.

Release liners are used in many personal care products. For example, many sanitary napkins have an adhesive strip on the backside of the napkin (the napkin surface opposite to the body-contacting surface) to fix the napkin to an undergarment and hold the napkin in place against the body. Before use, the adhesive strip is protected with a peelable release liner. Once removed, the peelable release liner must be discarded. Since peelable release liners are typically silicone-coated paper, the release liners do not disperse in water; consequently, disposal options are limited to depositing the release liner in a trash receptacle. Although disposing of conventional release liners in a toilet would be convenient to the consumer, such disposal potentially creates blockages in the toilet or household sewer line.

What is needed in the art is a flushable double-sided release sheet, which can be discarded and then flushed in a conventional toilet. Such a double-sided flushable release liner would offer convenience to the consumer, and not cause problems such as blockages in the sewage transport process.

SUMMARY OF THE INVENTION

The present invention comprises a flushable laminate having release characteristics, said laminate comprising a water-sensitive film and a release coating of polymeric material on both surfaces of the water-sensitive film, wherein the coating adheres to the water-sensitive film and provides release characteristics to both sides of the water-sensitive film. The present invention is also a method of making a flushable three-layer laminate having release characteristics, said method comprising applying a release coating of a polymeric material onto the surface of a water-sensitive film, wherein the release coating adheres to the water-sensitive film and provides release characteristics to both sides of the water-sensitive film.

The present invention is a double-sided flushable release liner based on a three-layer laminate comprising a water-sensitive film sandwiched between two layers of a release coating and to methods of making the double-sided flushable release liner. The release coating may be either a continuous coating or a coating in a discontinuous pattern. The advantages of this double-sided release liner are two-fold. The first is the cost savings of using half the number of release liners. For example, a feminine care panty liner pad is attached to each side of the flushable release strip by the garment adhesive. In service, the first of the pads is peeled for use, leaving the peel strip attached to the second; the garment adhesive on the second pad is still protected by the release liner until removed for use of that pad. Current practice places a release liner on each individual pad. With the present invention, two pads are placed on each liner. The second advantage of the double-sided release liner is the option of disposal through flushing the release liner after the second pad has been used. When discarded in the toilet, water rapidly reaches the water-sensitive film which loses strength and cohesive integrity. After the loss of strength due to contact with water, the force created from flushing is sufficient to break the release liner into pieces.

The present invention is also directed to a method of preparing a double-sided flushable release liner. The method comprises coating a thin layer of polymer having release characteristics onto both surfaces of a base film, wherein the base film comprises a water-sensitive polymer. When dry, the three-layer laminate displays mechanical features comparable to a conventional coated paper liner. The core base film itself may be manufactured, taking into consideration variables such as film thickness, molecular weight, and blending additives, to control the functionality of the plastic film The polymeric coating controls the release characteristics of the plastic film. The coating is formulated to provide very little adhesion to many substrates, particularly pressure-sensitive, hot-melt adhesives, so that the coating may be easily removed from an adhesive strip without disturbing the adhesive strip, while having high adhesion to the water-sensitive substrate. The coating formulation ensures that the three-layer polymer film peels at the surface of the release coating, not at the interface between the coating and the water-sensitive base film. It is further contemplated that the three-layer laminate comprising a water-sensitive film sandwiched between two layers of a release coating can be manufactured by coextrusion processes that are well known to those of ordinary skill in the art.

The present invention is also directed to articles containing the two layer flushable release liner. Specifically, the flushable release liners of the present invention are useful in connection with a variety of products, and especially absorbent products such as double-sided sanitary napkins, panty liners, diapers, wound dressings, bandages, an incontinence garment, sterile wraps, surgical drapes, and the like. Although the double-sided release liner of the present invention finds particular use in the above-mentioned products, the concept of a flushable two sided release liner has potential for any other application requiring a release material.

The present invention provides a mechanism for eliminating disposal problems associated with various consumer products. A nonlimiting detailed description of the invention and examples of specific embodiments are provided below.

DETAILED DESCRIPTION OF THE INVENTION

In many personal care products, a release liner is used to protect an adhesive layer before use. For example, in the current version of many panty liner pads, there is an adhesive strip on the backside of the pad (the surface opposite the body-contacting surface) which fixes the panty liner to the undergarment and holds it in place against the body. Before use, this adhesive strip is protected with a peelable release sheet. Each pad is typically covered with its own individual release liner, conventionally a silicone-coated paper. The release coating is formulated to stick very weakly to any substrate, and particularly to pressure-sensitive hot-melt adhesives, so the release sheet can be removed easily from the pad without disturbing the adhesive strip. Once removed, this peelable sheet must be discarded. As a silicone-coated paper, the conventional release sheet does not readily disperse in water, and so may block the toilet if discarded there.

A water-sensitive base film coated with a thin layer of polymer with release characteristics, can function as a flushable release strip. In a preferred embodiment of the present invention, coating both sides of the water-sensitive base film allows for two panty liners to be attached to one release strip. A double-sided release sheet between two pads reduces the quantity of release liners required. In addition to a cost savings, a flushable double-sided release sheet which can be safely discarded in a toilet offers an additional disposal convenience to the consumer.

The present invention is a three-layer release film and is flushable because of the water-sensitivity of the core film and low strength of the adjacent release coatings. As used herein, the term "flushable" describes a product which rapidly loses integrity and strength when discarded in a conventional sink or toilet. When the release film is placed in the toilet, the release coating allows rapid water transport to the water-sensitive core. The flushable feature of the coated water-sensitive film of the present invention comes from the water-sensitivity of the base film and the permeability or discontinuity of the thin release coating. When immersed in water, the base film readily wets and weakens. The water-sensitive film quickly loses integrity and strength when exposed to water. When the substrate layer loses its mechanical integrity, the pieces of release coating readily disperse under the flushing force of the toilet or water flow in the sink.

The mechanism of water transport to the core depends on the form of the release coating. One embodiment of the present invention is a thin continuous coating wherein water can diffuse through the coating quickly enough to weaken the water-sensitive core film It is to be understood that the coating layer is not a barrier film The diffusion time through the continuous coating is preferably within 30 seconds, but the diffusion time through the continuous coating is not critical to the present invention.

The three-layer laminate of the present invention is prepared by any process wherein a thin layer of polymer, having release characteristics, is uniformly and continuously coated onto at least one surface of a water-sensitive film, such as a polyethylene oxide (PEO) film Suitable coating processes include, but are not limited to, extrusion coating, solvent-base coating, and hot-melt coating. Suitable extrusion coating techniques include, but are not limited to, curtain extrusion coating and co-extrusion of the coating and the water-sensitive film. Suitable solvent-base coating techniques include, but are not limited to, spray coating. Suitable hot-melt coating techniques include, but are not limited to, slot coating, spray coating and gravure coating. Desirably, the coating process is a hot-melt slot coating process or an extrusion coating process. One such coating is described below.

Molten "release polymer" is delivered from a melting tank through a heated hose to a slot die. As used herein, the term "release polymer" describes a polymer which possesses release characteristics. The temperature of the melting tank, hose and slot die may vary depending upon the melt rheology of the release polymer in the coating process. The molten polymer is uniformly applied directly onto the water-sensitive film, or alternatively, onto a carrier substrate and subsequently transferred onto the water-sensitive film Line speeds may vary depending upon the "open time" of the release polymer. As used herein, the "open time" of a polymer refers to the amount of time required for the polymer to lose its tackiness.

In a transfer coating process, the coated carrier substrate moves further through the process and comes into contact with the water-sensitive film which is properly aligned with the coated carrier substrate. The coating is transferred from the carrier substrate to the water-sensitive film under pressure as the film and carrier substrate pass through a nip roll. In practice, optimum coating thickness is achieved by adjusting processing factors which include, but are not limited to, the release polymer, the coating temperature, the resin flow rate, line speed, and the pressure applied at the nip roll.

The carrier substrate used in the above-described process may be any substrate which can transfer the discontinuous release coating to the water-sensitive film. Suitable carrier substrates display little or no adhesion with the release coating relative to the adhesion between the water-sensitive film and the release coating. Suitable carrier substrates include, but are not limited to, release paper, release films, and release-coated substrates such as fabrics and/or belts. Desirably, the carrier substrate is a release paper. More desirably, the carrier substrate is an AKROSIL® High Release Paper.

The thickness of the release coating may vary greatly depending upon the end use of the three-layer laminate and/or products containing the three-layer laminate. However, film thickness should be minimized when possible to reduce product cost and to reduce the mechanical strength of the coating, particularly because the present invention is intended to be a flushable product, so that the coating will disperse due to the flushing forces of water on the coating. Desirably, the release coating thickness will be less than about 1.0 mi. (25.4 micrometers). More desirably, the release coating thickness will be less than about 0.6 mil (15.2 micrometers). Most desirably, the release coating thickness will be less than about 0.2 mil (5.1 micrometers). However, the coating should be thick enough to provide a uniform coating along the film surface.

In another embodiment of the present invention, the coating is in a discontinuous pattern with enough release surface being present on the core film to allow removal of the release strip at the desired time, but spaces in the application pattern of the release coat allow water direct access to the water-sensitive core film. Desirably, the discontinuous release coating is coated onto the water-sensitive film in the form of a plurality of dots. The dots may have any shape desired. Suitable shapes include, but are not limited to, circles, squares, rectangles, triangles, and hexagons. Desirably, the dot shape allows uniform, discontinuous coverage of the film and minimal spacing between adjacent dots. More desirably, the dots are present as substantially discontinuous interengaged shapes of release polymeric material, resembling pieces of a jigsaw puzzle, adhered to and uniformly covering the water-sensitive film surface. As used herein, the phrase "substantially discontinuous" describes a coating wherein the dots are completely distinct from one another with no overlapping of the dots, and also a coating wherein some overlapping of the dots takes place. As used herein, the term "interengaged" describes the relationship of the dots on the film surface such that the exposed surface area of the film is minimized.

Dot size and thickness may vary greatly depending upon the end use of the coated water-sensitive film-containing product. Desirably, dot dimensions should be less than about 100 mm for flushable films to avoid potential clogging in conventional toilets. Dot thickness should be minimized when possible to reduce product cost. Desirably, the discontinuous release coating has a coating thickness of less than about 1.0 mil (25.4 micrometers). More desirably, the discontinuous release coating has a coating thickness of less than about 0.6 mil (15.2 micrometers). Most desirably, the discontinuous release coating has a coating thickness of less than about 0.2 mil (5.1 micrometers). However, the coating should be thick enough to provide a continuous pattern of dots along the film surface.

The coated water-sensitive film of the present invention is prepared by any process wherein a thin layer of polymer, having release characteristics, is coated in a discontinuous pattern onto both surfaces of a water-sensitive film Suitable coating processes include, but are not limited to, solvent-base coating and hot-melt coating. Suitable solvent-base coating techniques include, but are not limited to, spray coating and ink jet printing. Suitable hot-melt coating techniques include, but are not limited to, slot coating, screen coating, spray coating, swirl coating, and gravure coating. Desirably, the coating process is a hot-melt screen coating process. At least a portion of the surface area of the water-sensitive film is left uncoated so that the coated water-sensitive film remains flushable. In most cases, between approximately 50% and 90% of the water-sensitive film should be coated with the preferred surface area being coated being approximately 80% of the surface area.

In either the direct coating process or the transfer coating process for both embodiments, the adhesion of the release coating to the water-sensitive film should be greater than the adhesion of the release coating to the screen (direct coating) or the carrier substrate (transfer coating). The choice of release polymer should take into consideration the desired release characteristics and adhesion properties of the release polymer. The release polymer should have good adhesion to the water-sensitive substrate.

Suitable release polymers for use in the present invention include any processible polymer with appropriate melt rheology, release characteristics and adhesion properties for application by the above-described hot melt coating processes. Suitable polymers include, but are not limited to, polyolefins, fluoropolymers, and silicones.

One or more of the release polymers above may be combined to form the coatings on the water-sensitive film. Further, the release polymer may contain one or more of the following additives including, but not limited to, compatibilizers, processing aids, plasticizers, tackifiers, detackifiers, slip agents, and antimicrobial agents, as fabricating agents or as modifiers depending on the specific properties desired in the coating and the final product.

The coating should be formulated to have desirable release characteristics including little adhesion to a variety of substrates, particularly pressure-sensitive, hot-melt adhesives, so that the coating may be easily removed from an adhesive strip without disturbing the adhesive strip, while having high adhesion to the water-sensitive substrate. The coating formulation ensures that the three-layer laminate peels at the surface of the release coating, not at the interface between the coating and water-sensitive base film Other release characteristics include low adhesion to the adhesive surfaces of the desired end use product, such as a panty liner, while having relatively high adhesion to the water-sensitive core. This ensures the separation of release strip composite from the panty liner, rather than the delamination of the release coating from the core when removing the panty liner.

Desirably, the release polymer is a polyalphaolefin having a melt viscosity of about 400 to about 8,000 cps at 190° C. Suitable polymers include, but are not limited to, amorphous ethylene-propylene copolymers. Particularly suitable polymers are manufactured by the U.S. Rexene Company under the tradename REXTAC®. One REXTAC® resin, RTE32, is particularly suitable for the present invention. In a further embodiment, one or more REXTAC® resins are blended with a low molecular weight, highly branched polyolefin to reduce the tackiness of the hydrophobic polymer coating. Desirably, the highly branched polyolefin has a number-average molecular weight (Mn) of less than about 2800. A particularly suitable low molecular weight, highly branched polyolefin, VYBAR® 253 ($M_n$=520), is manufactured by the Petrolite Corporation. Blends of REXTAC® and VYBAR® 253 provide good results as release coating materials. Desirably, the ratio of REXTAC® resin to VYBAR® 253 is from about 100/0 wt/wt to about 70/30 wt/wt. More desirably, the ratio of REXTAC® resin to VYBAR® 253 is from about 98/2 wt/wt to about 75/25 wt/wt. Most desirably, the ratio of REXTAC® resin to VYBAR® 253 is from about 95/5 wt/wt to about 80/20 wt/wt. Particularly useful blends are RTE32 VYBAR® 253 (95/5 wt/wt) and RTE32/NVYBAR® 253 (80/20 wt/wt).

In both embodiments of the present invention, either the thin continuous coating or the discreet discontinuous pattern, once the core film is exposed to water, whether produced by the direct coating method or the transfer coating method, the core film quickly loses strength and cohesive integrity, unlike the conventional silicone-coated paper which maintains its strength in water. After the water-sensitive core film has lost cohesive integrity, the low remaining strength from the release coatings on each side is insufficient to keep the core film structure intact under the force of flushing. The release film then disperses allowing for passage through the sewage system.

Water-sensitive films for use as the core film in the present invention include any water-sensitive film capable of withstanding the above-described coating processes. As used herein, the phrase "water-sensitive film" describes films which lose integrity over time when in the presence of water and includes, but is not limited to, water-soluble films and water-dispersible films. Suitable water-sensitive films have sufficient strength and adhesion properties for use in the above-described processes. Suitable polymers for the film include, but are not limited to, polyalkylene oxides, such as polyethylene oxide (PEO) and ethylene oxide/propylene oxide copolymers, polymethacrylic acid, polymethacrylic acid copolymers, polyvinyl alcohol, poly(2-ethyl oxazoline), polyvinyl methyl ether, polyvinyl pyrrolidone/vinyl acetate copolymers, methyl cellulose, ethyl cellulose, hydroxypropyl cellulose, hydroxypropyl methyl cellulose, ethyl hydroxyethyl cellulose, methyl ether starch, poly (n-isopropyl acrylamide), poly N-vinyl caprolactam, polyvinyl methyl oxazolidone, poly (2-isopropyl-2-oxazoline), and poly (2,4-dimethyl-6-triazinyl ethylene).

The water-sensitive core film of the present invention may be made entirely of water-sensitive polymeric material or may contain water-sensitive as well as water-insoluble materials so long as the film dissolves or disperses in water, such as in a conventional toilet. Additionally, water-sensitive films may also be made by combining various different types of water-sensitive film materials. In some embodiments, it may be desirable to employ one or more additives into the water-sensitive film material including, but not limited to, compatibilizers, processing aids, plasticizers, tackifiers, detackifiers, slip agents, and anti-microbial agents, as fabricating agents or as modifiers depending on the specific properties desired in the film and the final product.

Desirably, the water-sensitive film of the present invention comprises a polyalkylene oxide film or a polyvinyl alcohol film. More desirably, the water-sensitive film of the present invention comprises a polyethylene oxide film, an ethylene oxide/propylene oxide copolymer film or a polyvinyl alcohol More desirably, the water-sensitive film of the present invention comprises a polyethylene oxide film or a polyvinyl alcohol film. The polyethylene oxide film is the most desirable film for the transfer coating procedure, while the polyvinyl alcohol film is the most desirable film for the direct coating procedure.

With release characteristics and adhesion properties, the three-layer laminate of the present invention finds applicability in a variety of articles. Specifically, the flushable release liners of the present invention are useful in connection with a variety of products, and especially absorbent products such as double-sided sanitary napkins, disposable absorbent articles, diapers, sterile wraps, surgical drapes, wound dressings and the like. Although the release liner of the present invention finds particular use in the above-mentioned products, the concept of a flushable release liner has potential for any other applications wherein a release liner is used.

Those skilled in the art will readily understand that the three-layer laminates of the present invention may be advantageously employed in the preparation of a wide variety of products designed to contain at least one component having a release surface. Such products may comprise only the coated water-sensitive film or may comprise a coated water-sensitive film in combination with one or more additional layers such as coatings, films, fabrics, etc. Although the coated water-sensitive film of the present invention is particularly suited for release liners, the coated water-sensitive film of the present invention may be advantageously employed in the preparation of a wide variety of consumer products other than release liners.

It should be understood, of course, that the foregoing relates only to preferred embodiments of the present invention and that numerous modifications or alterations may be made therein without departing from the spirit and the scope of the invention as set forth in this disclosure and in the following claims.

What is claimed is:

1. A flushable laminate having release characteristics, said laminate comprising:
   a water-sensitive film; and
   a release coating of polymeric material on both surfaces of the water-sensitive film, wherein the coating adheres to the water-sensitive film and provides release characteristics to both sides of the water-sensitive film.

2. The flushable laminate of claim 1, wherein the water-sensitive film comprises polyethylene oxide, ethylene oxide/propylene oxide copolymers, polymethacrylic acid, polymethacrylic acid copolymers, polyvinyl alcohol, poly(2-ethyl oxazoline), polyvinyl methyl ether, polyvinyl pyrrolidone/vinyl acetate copolymers, methyl cellulose, ethyl cellulose, hydroxypropyl cellulose, hydroxypropyl methyl cellulose, ethyl hydroxyethyl cellulose, methyl ether starch, poly (n-isopropyl acrylamide), poly N-vinyl caprolactam, polyvinyl methyl oxazolidone, poly (2-isopropyl-2-oxazoline), poly (2,4-dimethyl-6-triazinyl ethylene) or a combination thereof.

3. The flushable laminate of claim 2, wherein the water-sensitive film comprises polyethylene oxide, ethylene oxide/propylene oxide copolymer, polyvinyl alcohol or a combination thereof.

4. The flushable laminate of claim 1, wherein the release coating comprises a polyolefin, a fluoropolymer, a silicone or a combination thereof.

5. The flushable laminate of claim 4, wherein the release coating comprises a polyalphaolefin having a melt viscosity of about 400 to about 8000 cps at 190° C.

6. The flushable laminate of claim 5, wherein the release coating further comprises at least one low molecular weight, highly branched polyolefin.

7. The flushable laminate of claim 1, wherein the release coating is substantially continuously coated on the water-sensitive film.

8. The flushable laminate of claim 1, wherein the release coating is coated in a discontinuous pattern.

9. The flushable laminate of claim 8, wherein the release coating pattern is in the form of dots.

10. The flushable laminate of claim 6, wherein the at least one low molecular weight, highly branched polyolefin has a number-average molecular weight of less than about 2800.

11. The flushable laminate of claim 3, wherein the water-sensitive film comprises polyethylene oxide.

12. The flushable laminate of claim 1, wherein the flushable laminate is a release liner.

13. The flushable laminate of claim 1, wherein the water-sensitive film has a thickness of less than about 2.0 mil (50.8 micrometers) and the coating has a thickness of less than about 1.2 mil (30.5 micrometers).

14. A flushable release liner comprising:
   a water-sensitive film; and
   a continuous release coating of polymeric material on both surfaces of the water-sensitive film, wherein the coating adheres to both sides of the water-sensitive film and provides release characteristics to both sides of the water-sensitive film.

15. The flushable release liner of claim 14, wherein the water-sensitive film comprises polyethylene oxide, ethylene oxide/propylene oxide copolymers, polymethacrylic acid, polymethacrylic acid copolymers, polyvinyl alcohol, poly (2-ethyl oxazoline), polyvinyl methyl ether, polyvinyl pyrrolidone/vinyl acetate copolymers, methyl cellulose, ethyl cellulose, hydroxypropyl cellulose, hydroxypropyl methyl cellulose, ethyl hydroxyethyl cellulose, methyl ether starch, poly (n-isopropyl acrylamide), poly N-vinyl caprolactam, polyvinyl methyl oxazolidone, poly (2-isopropyl-2-oxazoline), poly (2,4-dimethyl-6-triazinyl ethylene) or a combination thereof.

16. The flushable release liner of claim 15, wherein the water-sensitive film comprises polyethylene oxide, ethylene oxide/propylene oxide copolymer, polyvinyl alcohol or a combination thereof.

17. The flushable release liner of claim 14, wherein the release coating comprises a polyolefin, a fluoropolymer, a silicone or a combination thereof.

18. The flushable release liner of claim 17, wherein the release coating comprises a polyalphaolefin having a melt viscosity of about 400 to about 8000 cps at 190° C.

19. The flushable release liner of claim 17, wherein the release coating further comprises at least one low molecular weight, highly branched polyolefin.

20. The flushable laminate of claim 14, wherein the release coating is substantially continuously coated on the water-sensitive film.

21. The flushable laminate of claim 14, wherein the release coating is coated in a discontinuous pattern.

22. The flushable laminate of claim 21, wherein the release coating pattern is in the form of dots.

23. The flushable release liner of claim 19, wherein the at least one low molecular weight, highly branched polyolefin has a number-average molecular weight of less than about 2800.

24. The flushable release liner of claim 16, wherein the water-sensitive film comprises polyethylene oxide.

25. The flushable release liner of claim 14, wherein the water-sensitive film has a thickness of less than about 2.0 mil (50.8 micrometers) and the coating has a thickness of less than about 1.2 mil (30.5 micrometers).

26. A product comprising:
   a flushable three-layer laminate, wherein the flushable three-layer laminate comprises a water-sensitive film and a release coating of polymeric material on both surfaces of the water-sensitive film, wherein the coating adheres to both surfaces of the water-sensitive film and provides release characteristics to both sides of the water-sensitive film; and
   at least one additional layer adhered to the continuous release coating on the water-sensitive film.

27. The product of claim 26, wherein the product comprises a disposable absorbent article, a sanitary napkin, a wound dressing, a sterile wrap, a surgical drape, a panty liner, an incontinence garment, a bandage or a diaper.

28. The product of claim 26, wherein the additional layer comprises a panty liner pad.

* * * * *